United States Patent
Grundvig et al.

(10) Patent No.: US 8,289,643 B2
(45) Date of Patent: Oct. 16, 2012

(54) PHASE CALIBRATION SYSTEM FOR DISK DRIVES

(75) Inventors: Jeffrey Paul Grundvig, Loveland, CO (US); Joseph H. Havens, Pinckney, MI (US)

(73) Assignee: LSI Corporation, Milpitas, CA (US)

( * ) Notice: Subject to any disclaimer, the term of this patent is extended or adjusted under 35 U.S.C. 154(b) by 64 days.

(21) Appl. No.: 12/964,431

(22) Filed: Dec. 9, 2010

(65) Prior Publication Data

US 2012/0147493 A1 Jun. 14, 2012

(51) Int. Cl.
*G11B 5/09* (2006.01)
(52) U.S. Cl. ......................................................... 360/51
(58) Field of Classification Search .................... 360/51, 360/31, 42, 69, 75
See application file for complete search history.

(56) References Cited

U.S. PATENT DOCUMENTS

| 7,158,324 | B2 * | 1/2007 | Stein et al. ....................... 360/31 |
| 7,675,703 | B2 | 3/2010 | Albrecht et al. |
| 7,848,047 | B2 * | 12/2010 | Albrecht ......................... 360/75 |
| 2009/0237829 | A1 * | 9/2009 | Ozawa et al. .................... 360/75 |
| 2009/0244765 | A1 | 10/2009 | Albrecht |

* cited by examiner

*Primary Examiner* — Fred Tzeng
(74) *Attorney, Agent, or Firm* — Yee & Associates, P.C.

(57) ABSTRACT

A method and disk drive for calibrating a phase of a clock in the disk drive. The phase of the clock in the disk drive is changed such that a rate of change for the phase is substantially constant. A pattern of data is written to a magnetic material in the disk drive after the rate of change for the phase becomes substantially constant and while changing the phase of the clock. A selected phase of the clock at which the pattern of data that is written on the magnetic material has a desired quality is identified using the rate of change for the phase, a first point in time at which a timing mark on the magnetic material is read, a second point in time at which the timing mark is read, and a third point in time at which the pattern of data has the desired quality.

32 Claims, 7 Drawing Sheets

PHASE CALIBRATION SYSTEM FOR DISK DRIVES

BACKGROUND OF THE INVENTION

1. Technical Field

The present invention is directed generally toward disk drives and, in particular, to calibrating the phase for a disk drive. Still more particularly, the present disclosure relates to a method and apparatus for calibrating phase of a write clock in a read channel in a disk drive.

2. Description of the Related Art

Some hard disk drives incorporate patterned magnetic recording media. This patterned magnetic recording media is employed to increase the amount of data that can be stored on a hard disk drive.

With patterned magnetic media, the magnetic material on the disk drive may be patterned such that islands of media are present. These islands may be isolated from other islands. These islands may be grouped into, for example, data blocks that are isolated from other data blocks. Each island is a single bit and is separated from another island by a non-magnetic region on the media. In other words, one island of data is isolated from another island in the patterned media. These different islands of media may be arranged in data tracks in which the data tracks are concentric to each other.

When writing to this type of media, the phase of a write clock may need to be aligned with the islands to avoid introducing errors and obtain the highest quality of writing data to this type of media. A calibration procedure is performed to identify the best phase for use in writing data. Further, when the media is a magnetic disk spinning in the disk drive, the internal clock of the read channel for the disk drive needs to be frequency and phase locked to the frequency and phase, respectively, of the spinning magnetic disk prior to calibrating the phase of the write clock. Still further, prior to calibrating the phase of the write clock, a time delay between the read signals and the write signals and/or an amount of separation between the read head and the write head for the disk drive needs to be determined.

Currently, the calibration of the phase of the write clock involves writing test patterns on the disk using different phases for the write clock. The calibration also may include writing a modulated phase across a predetermined phase range. With either process, the test patterns are, then, read after they have been written to the magnetic media to identify the best phase for a particular purpose. For example, a phase that allows the pattern to align most optimally with the islands of magnetic media is desirable for a write clock when writing data to patterned media.

In writing test patterns using different phases, the test pattern is written as the write clock relative to the media is varied over a complete phase cycle, and one or more test patterns are written at each phase. By repeatedly writing the test pattern at multiple phases that span a complete clock cycle, the time needed to perform this type of calibration may be greater than desired. Time is needed to allow the clock circuit to settle on a particular phase before writing the test pattern in a meaningful manner. In the case of a modulated write clock ramped phase, time is needed to allow the phase ramp to become stable. In this manner, the time it takes to access a magnetic disk to begin writing the disk depends on the time it takes to calibrate the phase of the write clock.

Therefore, it would be advantageous to have a method and apparatus which takes into account one or more of the issues discussed above, as well as possibly other issues.

SUMMARY OF THE INVENTION

The different illustrative embodiments provide a method for calibrating a phase of a clock in a disk drive. The phase of the clock in the disk drive is changed such that a rate of change for the phase is substantially constant. A pattern of data is written to a magnetic material in the disk drive after the rate of change for the phase becomes substantially constant and while changing the phase of the clock. A selected phase of the clock at which the pattern of data that is written on the magnetic material has a desired quality is identified using the rate of change for the phase, a first point in time at which a timing mark on the magnetic material is read, a second point in time at which the timing mark is read, and a third point in time at which the pattern of data has the desired quality.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

The different advantageous embodiments recognize and take into account a number of different considerations. As used herein, a number, when used with reference to items, means one or more items. For example, "a number of different considerations" is one or more different considerations.

In these illustrative examples, the different illustrative embodiments recognize and take into account that writing a test pattern at various phases that span an entire cycle with one or more test patterns at each phase may be more time consuming than desirable. The different illustrative embodiments recognize and take into account that this type of process may be more time consuming than desired because the clock circuit is given time to settle accurately for each phase. The settling is allowed to occur before meaningful writing of the test pattern occurs.

The different illustrative embodiments also recognize and take into account that, although the changing of the phase through a ramp may be performed more quickly, accuracy may not be as great as desired. The different illustrative embodiments recognize and take into account that it may be difficult to control and/or predict when a ramp begins. The identification of when a ramp begins may be made more difficult because of delays in circuits, as well as settling time. These circuits include, for example, analog clock synthesizer circuits.

Thus, the different illustrative embodiments provide a method and disk drive for calibrating a phase for a clock in the disk drive. The phase of the clock in the disk drive is changed such that a rate of change for the phase of the clock relative to a magnetic material in the disk drive is substantially constant. A pattern of data is written to the magnetic material in the disk drive after the rate of change for the phase becomes substantially constant and while changing the phase of the clock. A selected phase of the clock at which the pattern of data that is written on the magnetic material has a desired quality is identified using the rate of change for the phase, a first point in time at which a timing mark on the magnetic material is read, a second point in time at which the timing mark is read, and a third point in time at which the pattern of data has the desired quality.

In this manner, a particular timing for the clock circuit may be selected to have a desired timing for generating write signals at a write head of a disk drive.

Figure 1:
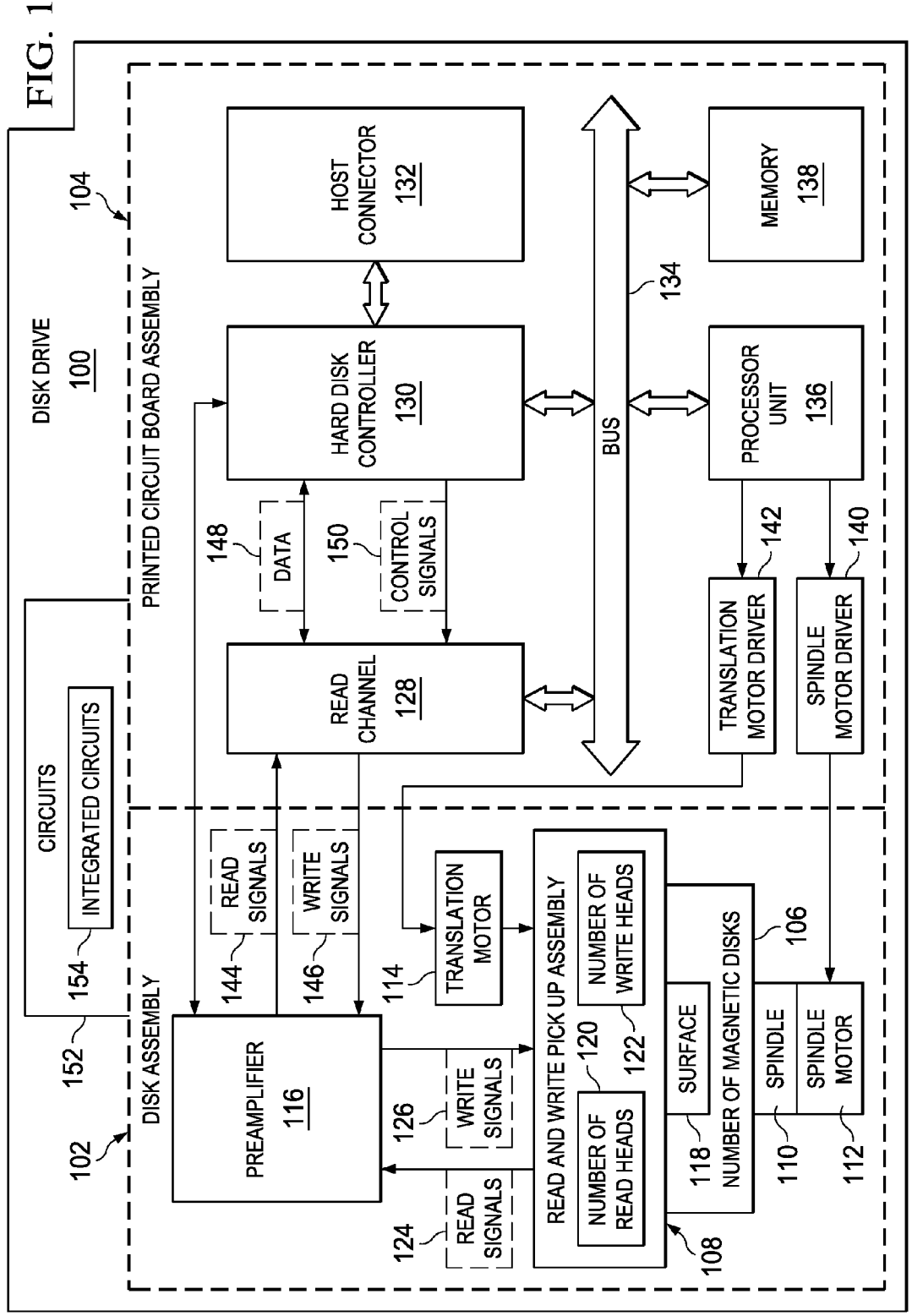
FIG. 1 is an illustration of a disk drive in accordance with an illustrative embodiment.

With reference now to FIG. 1, an illustration of a disk drive is depicted in accordance with an illustrative embodiment. In this illustrative example, disk drive 100 comprises disk assembly 102 and printed circuit board assembly 104.

As depicted, disk assembly 102 comprises number of magnetic disks 106, read and write pick up assembly 108, spindle 110, spindle motor 112, and translation motor 114. Number of magnetic disks 106 is connected to spindle 110. Spindle 110 is also connected to spindle motor 112. Spindle motor 112 is configured to turn spindle 110, which, in turn, turns number of magnetic disks 106.

As used herein, when a first component is connected to a second component, the first component may be connected to the second component without any additional components. The first component also may be connected to the second component by one or more other components. For example, one electronic device may be connected to a second electronic device without any additional electronic devices between the first electronic device and the second electronic device. In some cases, another electronic device may be present between the two electronic devices connected to each other.

Read and write pick up assembly 108 is located over surface 118 for number of magnetic disks 106. In other words, read and write pick up assembly 108 may be such that a portion of read and write pick up assembly 108 is present over surface 118 of each of number of magnetic disks 106.

In these illustrative examples, read and write pick up assembly 108 may include number of read heads 120 and number of write heads 122. In some illustrative examples, number of read heads 120 and number of write heads 122 may be implemented using the same physical structure.

Translation motor 114 is configured to move read and write pick up assembly 108 over surface 118. Preamplifier 116 is connected to read and write pick up assembly 108. In these illustrative examples, preamplifier 116 is electrically connected to read and write pick up assembly 108. In these examples, components being electrically connected means that electrical signals may be transferred between the components that are electrically connected to each other.

Number of read heads 120 in read and write pick up assembly 108 generates read signals 124. Read signals 124 are received by preamplifier 116. Preamplifier 116 may send write signals 126 to number of write heads 122 in read and write pick up assembly 108. Number of write heads 122 then writes write signals 126 onto number of magnetic disks 106.

As illustrated, printed circuit board assembly 104 comprises read channel 128, hard disk controller 130, host connector 132, bus 134, processor unit 136, memory 138, spindle motor driver 140, and translation motor driver 142. In these illustrative examples, read channel 128 is electrically connected to preamplifier 116. Read channel 128 is also connected to hard disk controller 130 and bus 134. Read channel 128 may receive read signals 144 from preamplifier 116. Additionally, read channel 128 may send write signals 146 to preamplifier 116. Read signals 144 received from preamplifier 116 are processed or amplified versions of read signals 124 in these illustrative examples. Write signals 146 may be processed and/or amplified to form write signals 126 in these illustrative examples.

Read channel 128 provides an interface between printed circuit board assembly 104 and disk assembly 102 for different read and write operations that may be performed. In these illustrative examples, data 148 may be transferred between read channel 128 and hard disk controller 130. Data 148 may be data written to number of magnetic disks 106, or data read from number of magnetic disks 106. Additionally, hard disk controller 130 may provide control signals 150 to read channel 128. Control signals 150 may be used to control the reading or writing of data with respect to number of magnetic disks 106.

In these illustrative examples, hard disk controller 130 is connected to host connector 132 and bus 134. Data 148 may be transferred between hard disk controller 130 and host connector 132. Host connector 132 is configured for connection to a data processing system. In particular, host connector 132 may be connected to a bus or other connector in a data processing system. Host connector 132 may be, for example, without limitation, a firewire connection, a universal serial bus connection, a peripheral interconnect connection, or some other suitable type of connection.

In these illustrative examples, processor unit 136 is connected to bus 134, spindle motor driver 140, and translation motor driver 142. Processor unit 136 may be one or more processors. For example, processor unit 136 may include multiple processors that are the same type or different type, depending on the particular implementation. Memory 138 may store information or program code for operating disk drive 100. In these illustrative examples, processor unit 136 controls spindle motor driver 140 and translation motor driver 142 to control the operations of spindle motor 112 and translation motor 114.

In the different illustrative examples, different components within disk drive 100 may be implemented with circuits. These circuits may be formed using integrated circuit technology. For example, at least one of preamplifier 116, read channel 128, hard disk controller 130, processor unit 136, translation motor driver 142, and spindle motor driver 140, and other suitable components in disk drive 100 may be implemented using circuits 152 in the form of integrated circuits 154. Further, these different components may be located on the same integrated circuit or on different integrated circuits within integrated circuits 154. An integrated circuit may also be referred to as a chip or a microchip.

The illustration of disk drive 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, the different connections between different components may be made through optical connections rather than electrical connections, depending on the particular implementation. Further, in some illustrative examples, hardware modules may be present to implement various functions rather than using program code, depending on the particular implementation.

Figure 2:
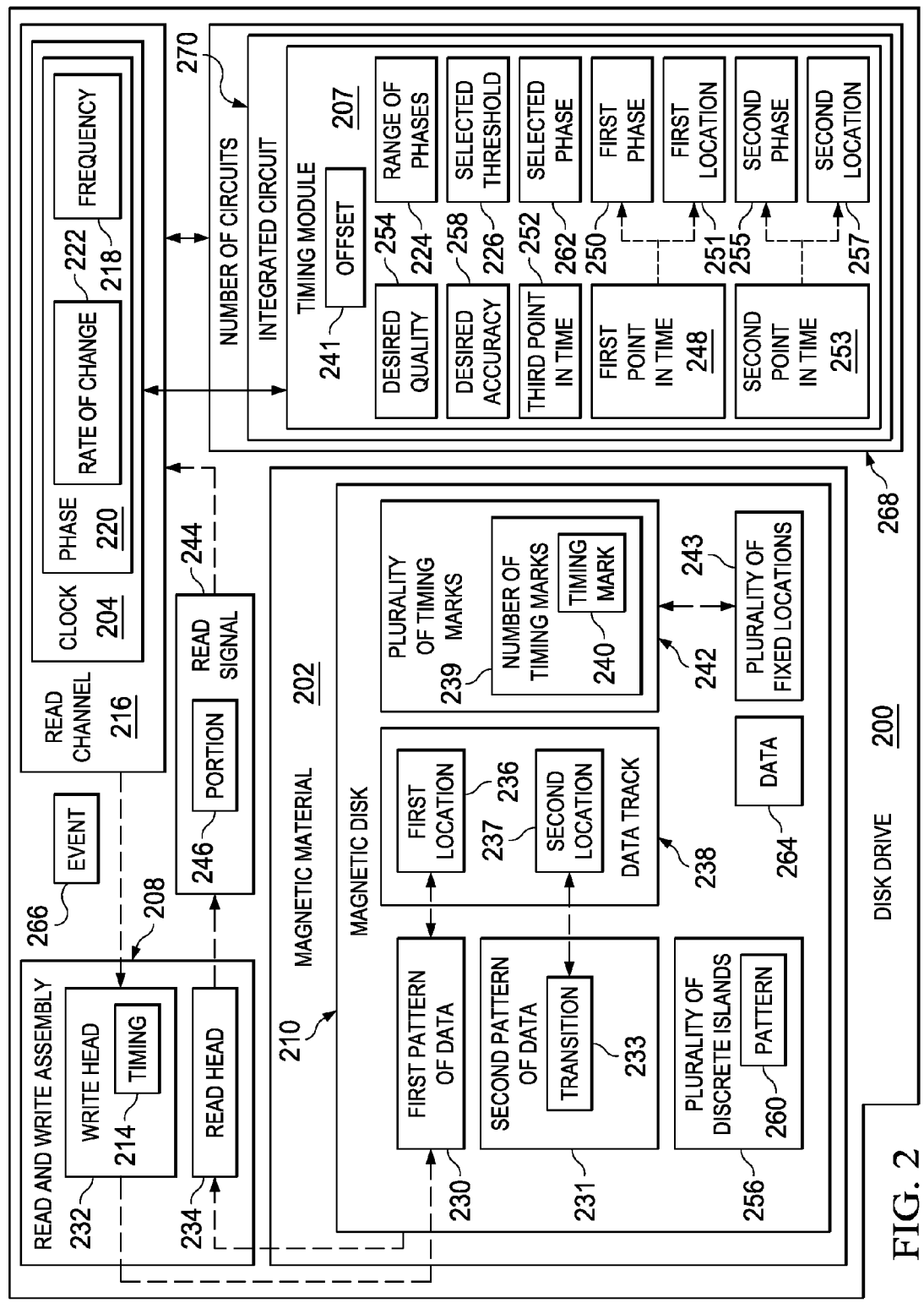
FIG. 2 is an illustration of a block diagram of a disk drive in accordance with an illustrative embodiment.

With reference now to FIG. 2, an illustration of a block diagram of a disk drive is depicted in accordance with an illustrative embodiment. In these illustrative examples, disk drive 200 may be implemented using disk drive 100 in FIG. 1. Disk drive 200 comprises magnetic material 202, clock 204, timing module 207, and read and write assembly 208.

As depicted in these examples, magnetic material 202 takes the form of magnetic disk 210. Magnetic disk 210 is an example of a magnetic disk in number of magnetic disks 106 in FIG. 1. Magnetic disk 210 is any disk with magnetic material onto which data may be written. Timing 214, with which data is written to magnetic disk 210, is controlled by clock 204.

In these illustrative examples, clock 204 is associated with read channel 216. In particular, in these examples, clock 204 is internal to read channel 216. Read channel 216 may be implemented using read channel 128 in FIG. 1. Clock 204 is a circuit configured to generate a clock signal. The clock signal may take the form of, for example, a square wave. This clock signal controls timing 214 for the writing of data to magnetic disk 210. In these depicted examples, frequency 218 and phase 220 of clock 204 may be changed to change the clock signal generated by clock 204. In this manner, timing 214 for writing data to magnetic disk 210 may also be changed.

Timing module 207 is configured to control frequency 218 and/or phase 220 of clock 204 to change timing 214 for writing data to magnetic disk 210. Timing module 207 may comprise hardware, firmware, and/or software components. For example, timing module 207 may be associated with a processor unit in disk drive 200, such as processor unit 136 in disk drive 100 in FIG. 1. Timing module 207 may be hardware and/or firmware components that are part of the processor unit. In other illustrative examples, timing module 207 may be a separate component or hardware circuit associated with and/or electrically connected to read channel 216 and/or clock 204 in read channel 216.

In these illustrative examples, timing module 207 is configured to change phase 220 of clock 204 such that rate of change 222 for phase 220 is substantially constant. Rate of change 222 may also be referred to as the slope for phase 220. In this manner, phase 220 of clock 204 may be ramped. Ramping phase 220 comprises changing phase 220 through range of phases 224 substantially continuously. Range of phases 224 may be, for example, without limitation, about zero degrees to about 360 degrees, about −180 degrees to about 180 degrees, or some other suitable range of phases.

In one illustrative example, phase 220 of clock 204 is changed by changing frequency 218 of clock 204. For example, frequency 218 is changed from a first frequency to a second frequency. More specifically, frequency 218 is changed from the first frequency to the second frequency in the form of a step such that the second frequency remains substantially constant. This type of change to frequency 218 causes phase 220 to change with a substantially constant rate of change 222. In other words, the step change in frequency 218 causes phase 220 to ramp through range of phases 224.

When the change in phase 220 through range of phases 224 is initiated, rate of change 222 for phase 220 may not be substantially constant at the beginning of this change. The time needed for rate of change 222 for phase 220 to become substantially constant within selected threshold 226 is the settling time for phase 220.

In these illustrative examples, read and write assembly 208 may be used to write first pattern of data 230 and second pattern of data 231 to magnetic disk 210 after rate of change 222 for phase 220 becomes substantially constant within selected threshold 226. First pattern of data 230 is a test pattern of data. Second pattern of data 231 comprises transition 233 that can be recognized when read. For example, second pattern of data 231 may comprise a string of "1"s followed by a string of "0"s in which transition 233 is the transition from "1" to "0". As another example, second pattern of data 231 may comprise a string of "0"s followed by a string of "1"s in which transition 233 is the transition from "0" to "1".

Read and write assembly 208 comprises write head 232 and read head 234 in these examples. Write head 232 is configured to follow a write path to write first pattern of data 230 and second pattern of data 231 to magnetic disk 210 in response to write signals generated by read channel 216. The timing of these write signals is controlled by clock 204. As one illustrative example, when rate of change 222 for phase 220 becomes substantially constant, timing module 207 may send a command to read channel 216 to send write signals for writing first pattern of data 230 and second pattern of data 231 to write head 232. Second pattern of data 231 may be written before or after first pattern of data 230 is written.

As depicted in these examples, write head 232 writes first pattern of data 230 to magnetic disk 210 at first location 236 in data track 238 in magnetic disk 210. Data track 238 may be any one of a plurality of data tracks 238 in magnetic disk 210. First location 236 in data track 238 is a location relative to number of timing marks 239 in plurality of timing marks 242. In particular, first location 236 is relative to timing mark 240 in number of timing marks 239. Plurality of timing marks 242 is in plurality of fixed locations 243 on magnetic disk 210. In these examples, each data track in the plurality of data tracks in magnetic disk 210 may have a set of timing marks from plurality of timing marks 242 written to the data track. The locations for the set of timing marks in a particular data track may be substantially equally spaced apart in these examples. Of course, in other illustrative examples, these locations may have different spacings relative to each other.

First location 236, in these illustrative examples, is before timing mark 240. Further, a number of additional timing marks from plurality of timing marks 242 is not present between first location 236 and timing mark 240. In some illustrative examples, first location 236 may be between timing mark 240 and a second timing mark in number of timing marks 239. In this manner, first location 236 may be before or after timing mark 240.

Further, write head 232 writes second pattern of data 231 such that transition 233 occurs at second location 237 in data track 238. Second location 237 is after first location 236 in these examples. Of course, in other illustrative examples, second location 237 may be before first location 236. Further, second location 237 is before timing mark 240. A number of additional timing marks from plurality of timing marks 242 is not present between second location 237 and timing mark 240.

After writing first pattern of data 230 and second pattern of data 231 to magnetic disk 210, read head 234 is configured to read timing mark 240. In these illustrative examples, read head 234 reads data track 238, while write head 232 is following the write path along data track 238 in magnetic disk 210. In this manner, read head 234 reads timing mark 240 on data track 238, while write head 232 is following the write path along data track 238. In these illustrative examples, read head 234 is separated from write head 232 such that read head 234 begins reading timing mark 240 in data track 238 at a location in data track 238 that is offset from a location where write head 232 is located. This offset is offset 241. Between timing marks on data track 238, write head 232 is writing first pattern of data 230 or second pattern of data 231.

In these illustrative examples, read head 234 generates read signal 244 when reading data track 238. Portion 246 of read signal 244 is the portion of read signal 244 that corresponds to timing mark 240. Read channel 216 receives read signal 244 and sends read signal 244 to timing module 207 for processing. Timing module 207 processes read signal 244 and identifies timing mark 240 in portion 246 of read signal 244.

Timing module 207 identifies first point in time 248 at which timing mark 240 is identified. Further, timing module 207 identifies first phase 250 and first location 251 of timing mark 240 at first point in time 248 relative to clock 204 at which timing mark 240 is read, while write head 232 follows the write path along data track 238. Timing module 207 stores the values for first phase 250 and first location 251. First phase 250 of timing mark 240 is an offset relative to clock 204. For example, first phase 250 of timing mark 240 may be an offset relative to a rise in the clock signal generated by clock 204. First location 251 of timing mark 240 is the location of timing mark 240 in data track 238.

Additionally, in these illustrative examples, the write path along data track 238 may include write head 232 writing first pattern of data 230 and second pattern of data 231 to magnetic disk 210 a selected number of times along data track 238 during one revolution around data track 238. In particular, first pattern of data 230 and second pattern of data 231 may be written to magnetic disk 210 at a number of locations along data track 238 in which each location is before a timing mark. In these examples, read head 234 may be configured to read each timing mark that is present after the location where first pattern of data 230 and second pattern of data 231 are written. Further, timing module 207 identifies the point in time at which each timing mark is read and the phase and location of the timing mark at the particular point in time.

In these illustrative examples, read head 234 is also configured to follow a read path along data track 238 after write head 232 has completed writing first pattern of data 230 and second pattern of data 231 the selected number of times to data track 238 and/or after a revolution of data track 238 has been completed. Read head 234 reads data track 238, while following the read path. Timing module 207 identifies second point in time 253 at which timing mark 240 is identified. Further, timing module 207 identifies second phase 255 and second location 257 of timing mark 240 at second point in time 253 at which timing mark 240 is read while read head 234 is following the read path along data track 238.

In these depicted examples, timing module 207 compares first phase 250 and first location 251 of timing mark 240 stored while first pattern of data 230 and second pattern of data 231 were being written to magnetic disk 210 with second phase 255 and second location 257 of timing mark 240 read after first pattern of data 230 and second pattern of data 231 were read from magnetic disk 210. Timing module 207 uses this comparison and an identification of when transition 233 is read along the read path to identify offset 241 corresponding to the separation between write head 232 and read head 234.

As one illustrative example, transition 233 for second pattern of data 231 may be expected to be written about 200 bit periods prior to timing mark 240 based on read head 234 reading timing mark 240, while write head 232 follows the write path. A bit period is the amount of time required to move from one bit on magnetic disk 210 to another bit on magnetic disk 210. In other words, the bit period is the amount of time required to write or read a logical one or a logical zero onto or from, respectively, magnetic disk 210. A bit period may also be referred to as a clock cycle in these illustrative examples. However, transition 233 is identified as occurring about 270 bit periods prior to timing mark 240 when transition 233 is read as read head 234 follows the read path. In this illustrative example, timing module 207 identifies offset 241 as about 70 bit periods. By storing first location 251 of timing mark 240 at the time of writing along the write path, the calibration process may begin even before the disk locked clock control loop has stabilized or reached steady state performance.

Timing module 207 uses offset 241 to identify third point in time 252 at which first pattern of data 230 written to magnetic disk 210 has desired quality 254. Desired quality 254 for first pattern of data 230 is first pattern of data 230 substantially aligning with plurality of discrete islands 256 along data track 238 with desired accuracy 258. Plurality of discrete islands 256 is a plurality of discrete magnetic bits for storage of data. Each discrete island in plurality of discrete islands 256 is a magnetic region separated from other discrete islands in plurality of discrete islands 256 by nonmagnetic regions or spaces on magnetic disk 210. Magnetic disk 210 may have multiple pluralities of discrete islands. For example, each data track may have multiple pluralities of discrete islands to which data can be written.

As depicted, plurality of discrete islands 256 may have pattern 260. Pattern 260 may comprise a spacing between discrete islands, a shape for the plurality of discrete islands, a particular number of discrete islands, and/or some other suitable type of pattern. Desired quality 254 for first pattern of data 230 is first pattern of data 230 substantially aligning with pattern 260 for plurality of discrete islands 256 with desired accuracy 258. When magnetic disk 210 has multiple pluralities of discreet islands, magnetic disk 210 may be referred to as a patterned magnetic disk.

Timing module 207 uses rate of change 222 for phase 220 of clock 204, third point in time 252 at which first pattern of data 230 has desired quality 254, offset 241, and timing mark 240 to identify selected phase 262 for clock 204. More specifically, timing module 207 uses offset 241, first phase 250, first location 251, second phase 255, and second location 257 of timing mark 240 along with rate of change 222 for phase 220 of clock 204, and the difference between second point in time 253 and third point in time 252 to identify selected phase 262 for clock 204. Timing module 207 also adjusts selected phase 262 based on the difference between first point in time 248 and second point in time 253. Selected phase 262 is the phase for clock 204 at which data may be written to magnetic disk 210 with a desired accuracy and quality.

In these illustrative examples, timing module 207 may change phase 220 of clock 204 to selected phase 262. Data 264 may be written to magnetic disk 210 with clock 204 having selected phase 262. In this manner, the phase of clock 204 is calibrated for use in writing data to magnetic disk 210.

The process described above for calibrating phase 220 of clock 204 may be initiated in response to event 266. Event 266 may be, for example, without limitation, starting disk drive 200, a change in temperature in disk drive 200, a change in the particular data track to which data is being written, a change in frequency 218 for clock 204, a change in the speed of disk drive 200, and/or some other suitable type of event.

In these illustrative examples, timing module 207 may be implemented in number of circuits 268. Number of circuits 268 may take the form of integrated circuit 270. Further, integrated circuit 270 may include only number of circuits 268 for timing module 207 or may include circuits for other components. For example, number of circuits 268 for timing module 207 may be located on the same integrated circuit as circuits for read channel 216 in some illustrative examples.

The illustration of disk drive 200 in FIG. 2 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, although, in these illustrative embodiments, magnetic disk 210 is a patterned magnetic disk, magnetic disk 210 may take some other suitable form in some illustrative examples. In other illustrative examples, read head 234 and write head 232 may be part of the same recording head. In other words, a recording head may be configured to function as both read head 234 and write head 232.

In some illustrative examples, first pattern of data 230 and second pattern of data 231 may each be portions of the same pattern of data. In other illustrative examples, second pattern of data 231 may not be needed. For example, offset 241 may already be known prior to writing first pattern of data 230.

Figure 3:
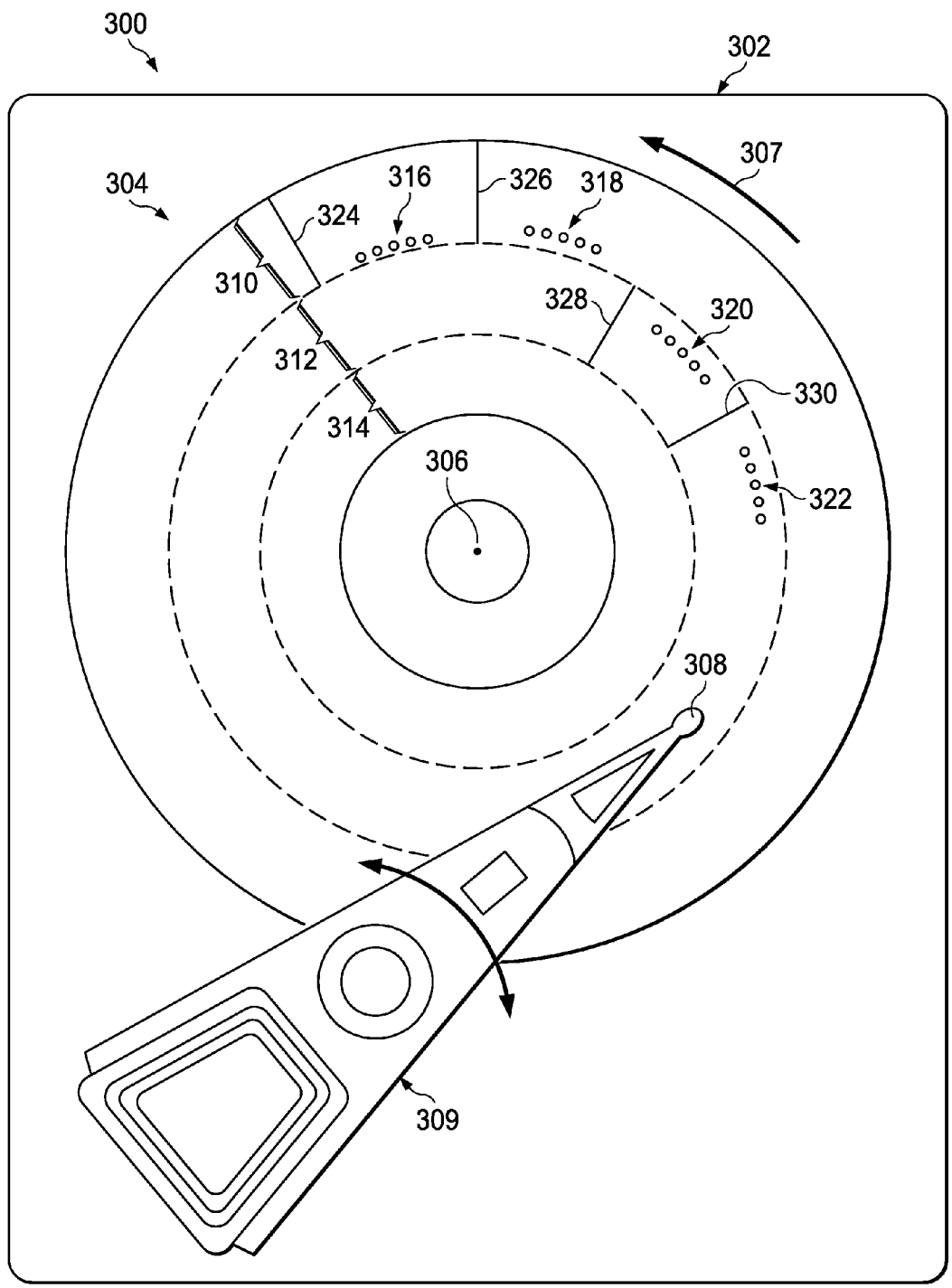
FIG. 3 is an illustration of a disk drive in accordance with an illustrative embodiment.

With reference now to FIG. 3, an illustration of a disk drive is depicted in accordance with an illustrative embodiment. In this illustrative example, disk drive 300 is an example of one implementation for disk drive 100 in FIG. 1 and disk drive 200 in FIG. 2. As depicted, disk drive 300 has housing 302. Housing 302 supports a spindle (not shown) and spindle motor (not shown), such as spindle 110 and spindle motor 112 in FIG. 1, for rotating magnetic disk 304 about center 306 of magnetic disk 304 in the direction of arrow 307. Magnetic disk 304 may also be referred to as a patterned magnetic recording disk in these illustrative examples.

In this illustrative example, disk drive 300 also includes read and write pick up assembly 309. Read and write pick up assembly 309 includes recording head 308. Recording head 308 is configured to both read and write data to magnetic disk 304. Recording head 308 may be, for example, without limitation, an inductive write head with a magnetoresistive read head.

As depicted, magnetic disk 304 includes data zones 310, 312, and 314. Each of these data zones is a grouping of data tracks in which pluralities of discrete islands are arranged. The data tracks are radially-spaced circular data tracks in this illustrative example. Further, pluralities of discrete islands 316, 318, 320, and 322 are examples of discrete islands arranged in portions of tracks on magnetic disk 304. Of course, other pluralities of discrete islands may be present on magnetic disk 304.

In this illustrative example, magnetic disk 304 also includes timing marks. For example, magnetic disk 304 includes timing marks 324, 326, 328, and 330, as well as other timing marks. In each data zone, these timing marks are substantially equally spaced apart in that data zone. Further, these timing marks are at fixed locations on magnetic disk 304. These timing marks can be read by recording head 308.

Figure 4:
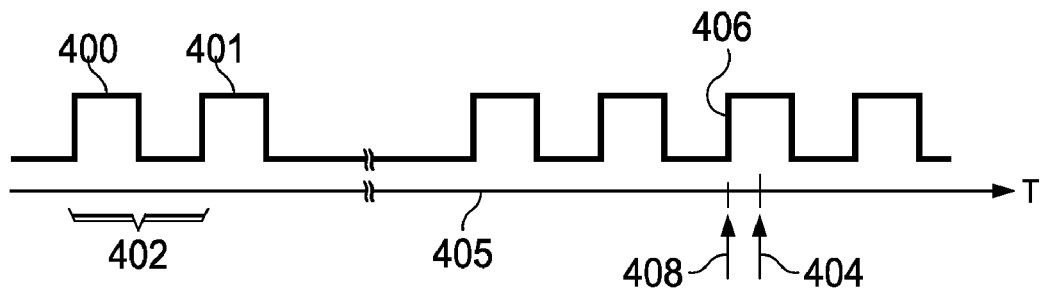
FIG. 4 is an illustration of a clock signal generated by a clock in accordance with an illustrative embodiment.

With reference now to FIG. 4, an illustration of a clock signal generated by a clock is depicted in accordance with an illustrative embodiment. In this illustrative example, clock signal 400 is an example of one implementation for a clock signal generated by clock 204 in FIG. 2. As depicted, clock signal 400 takes the form of substantially square wave 401. Square wave 401 may be clock signal 400 after clock signal 400 has been processed using signal processing techniques.

In this depicted example, clock cycle 402 is an example of one clock cycle for clock signal 400. Clock cycle 402 is a bit period in this example. Each clock cycle begins with a rise in the clock signal and ends just before the next rise for the clock signal. In this illustrative example, a phase of the clock generating clock signal 400 has a rate of change that is substantially constant. Further, the phase of the clock changes through a range of phases. This range of phases is from about zero degrees to about 360 degrees. Further, the phase of the clock changes from about zero degrees to about 360 degrees with a rate of change that is substantially constant. In other words, the phase of the clock is ramped from about zero degrees to about 360 degrees. This ramping of the phase takes about 1,000 clock cycles. In other words, the phase of the clock is continuously changed from about zero degrees to about 360 degrees with a substantially constant rate of change in about 1,000 clock cycles.

In this illustrative example, point in time 404 with respect to time 405 is an example of a point in time at which a timing module, such as timing module 207 in FIG. 2, may identify a timing mark after a pattern of data has been written to a magnetic disk. At point in time 404, the timing mark has a phase of about 90 degrees relative to the clock. More specifically, at point in time 404, the timing mark has a positive offset of about 90 degrees from rise 406 for clock signal 400 at point in time 408.

Additionally, the timing mark identified at point in time 404 may also be identified as, for example, being about 100 clock cycles after a point in time at which the pattern of data written to the magnetic disk has a desired quality. The timing module may use the phase of the timing mark, the rate of change for the phase of the clock, the offset corresponding to the separation between the read head and the write head, and the difference between point in time 404 and the point in time at which the pattern of data written to the magnetic disk has the desired quality to identify the phase of the clock at the point in time at which the pattern of data written to the magnetic disk has the desired quality.

As one illustrative example, the offset corresponding to the separation between the read head and the write head is minus 50 clock cycles. Further, the location of the timing mark identified while writing to the data track compared to the location of the timing mark identified while reading the data track after writing is identified as minus two clock cycles. The timing module may identify a selected phase for the clock as the phase at the point in time at which the pattern of data has the desired quality using the following:

$$SP = TMP - ((\text{difference} - \text{offset} - \text{tmdiff})/\text{phase ramping period}) * \text{phase range, where}$$

$$SP = 90 \text{ degrees} - ((100 + 50 + 2) \text{ cycles}/1000 \text{ cycles}) * 360 \text{ degrees},$$

where SP is the selected phase, which is the phase of the clock at the point in time at which the pattern of data written to the magnetic disk has the desired quality; TMP is the phase of the timing mark; difference is the number of clock cycles between the timing mark and the point in time at which the pattern of data has the desired quality; offset is the offset corresponding to the separation of the read head and the write head; tmdiff is the difference between the location of the timing mark identified at the time of writing as compared to the location of the timing mark identified at the time of reading; phase ramping period is the number of cycles needed for the phase to ramp through the range of phases; and phase range is the range of phases for the clock.

Figure 5:
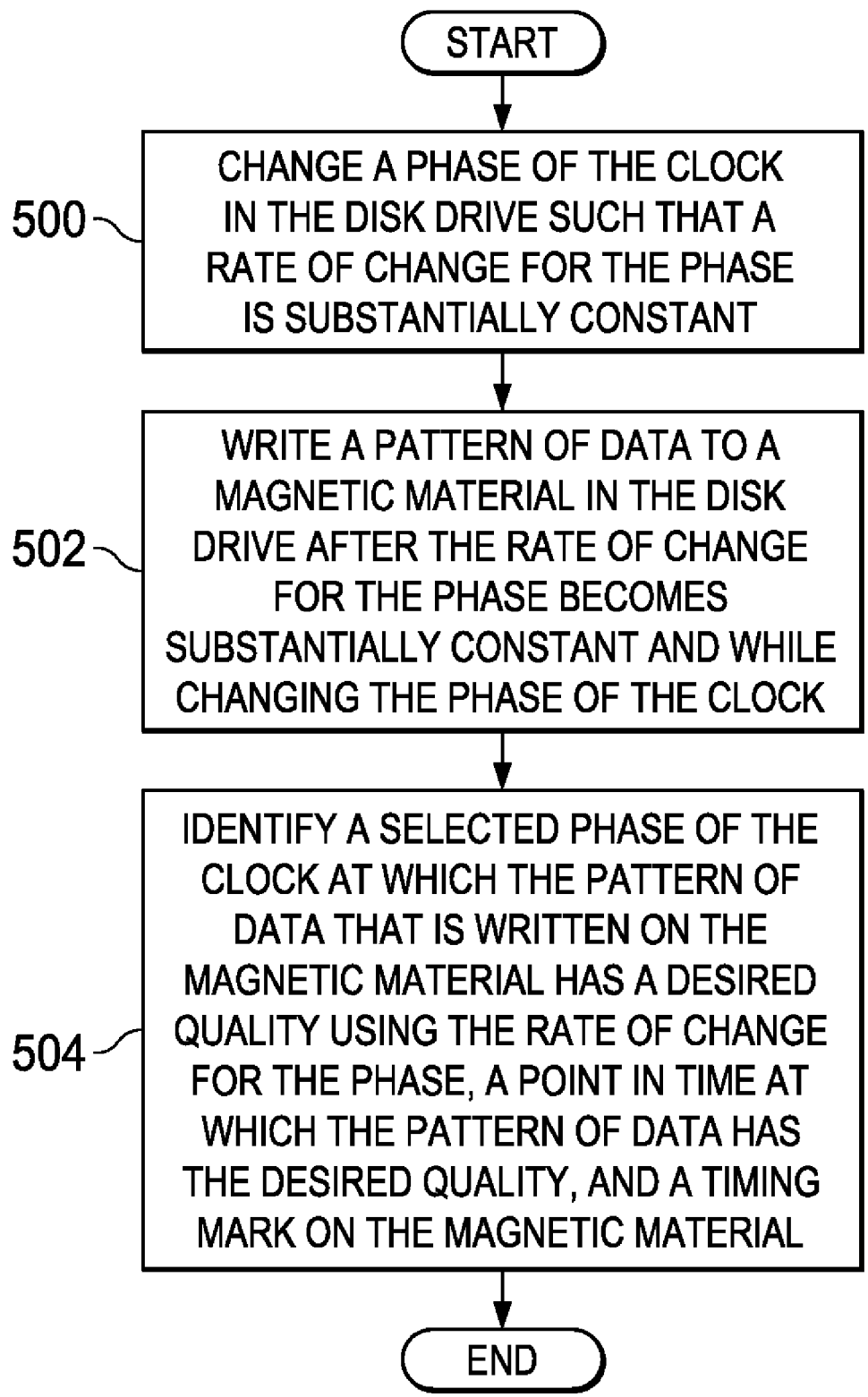
FIG. 5 is an illustration of a flowchart of a process for calibrating a phase of a clock in a disk drive in accordance with an illustrative embodiment.

With reference now to FIG. 5, an illustration of a flowchart of a process for calibrating a phase of a clock in a disk drive is depicted in accordance with an illustrative embodiment. The process illustrated in FIG. 5 may be implemented using disk drive 200 in FIG. 2. In particular, this process may be implemented using clock 204, magnetic material 202, and timing module 207 in FIG. 2.

The process begins by changing a phase of the clock in the disk drive such that a rate of change for the phase is substantially constant (operation 500). In other words, in operation 500, the phase of the clock is ramped through a range of phases. In this illustrative example, the clock is internal to a read channel in the disk drive.

Thereafter, the process writes a pattern of data to a magnetic material in the disk drive after the rate of change for the phase becomes substantially constant and while changing the phase of the clock (operation 502). In operation 502, the pattern of data is written to the magnetic material as the phase is ramped.

The process then identifies a selected phase of the clock at which the pattern of data that is written on the magnetic material has a desired quality using the rate of change for the phase, a point in time at which the pattern of data has the desired quality, and a timing mark on the magnetic material (operation 504), with the process terminating thereafter. The selected phase may be used for writing data to the magnetic material.

Figure 6A:
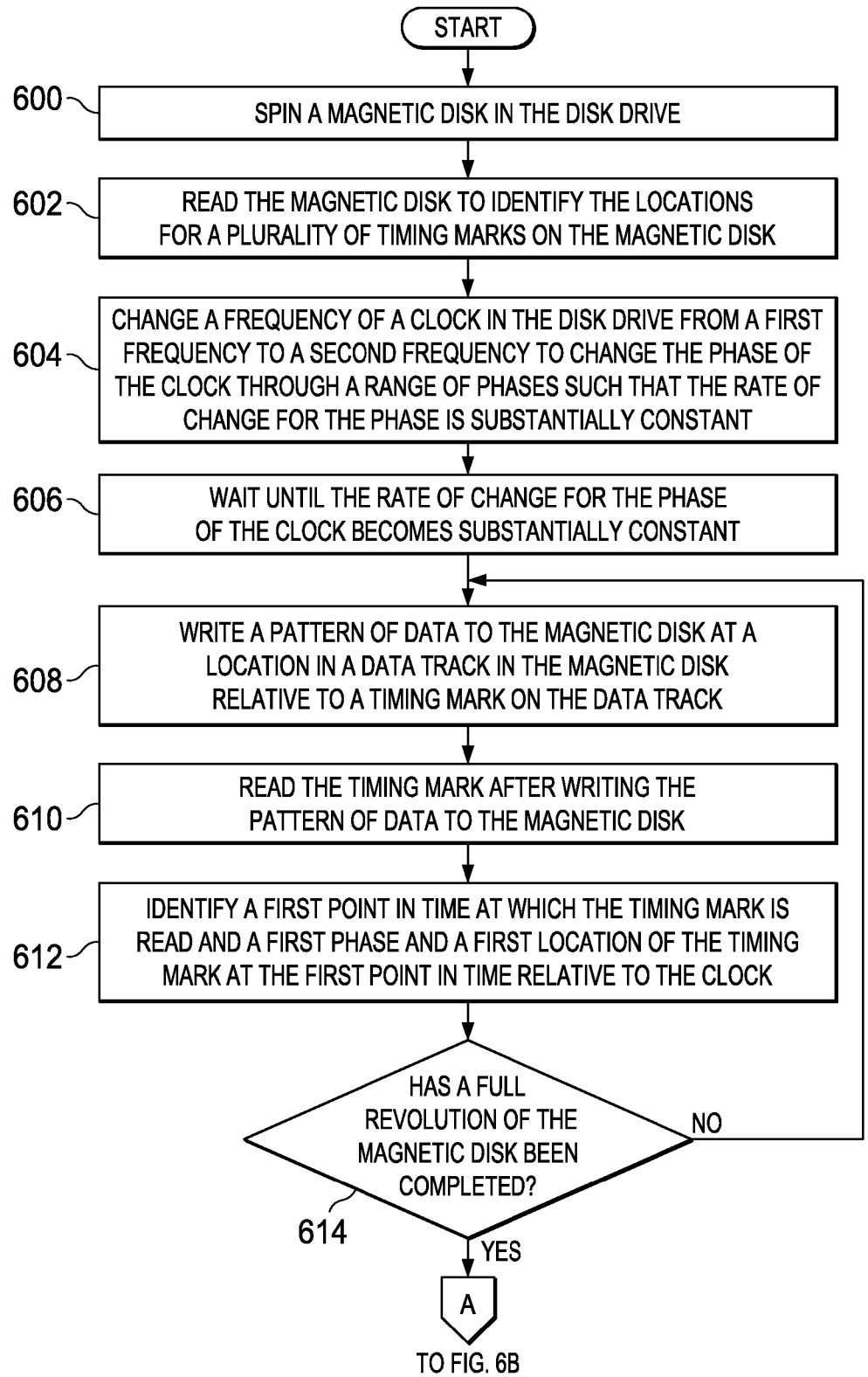
FIGS. 6A and 6B are illustrations of a flowchart of a process for calibrating a phase of a clock in a disk drive in accordance with an illustrative embodiment.
Figure 6B:
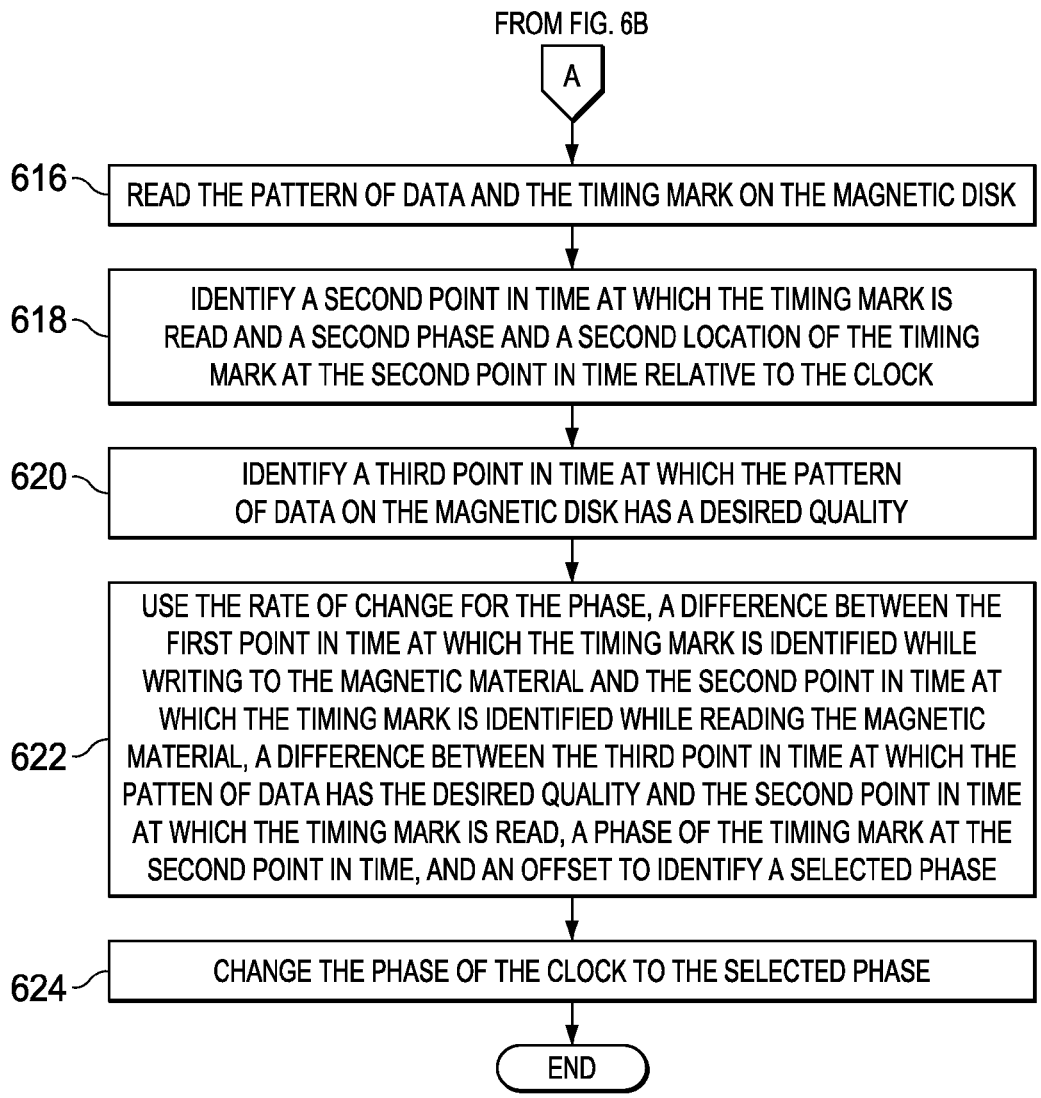

With reference now to FIGS. 6A and 6B, illustrations of a flowchart of a process for calibrating a phase of a clock in a disk drive are depicted in accordance with an illustrative embodiment. The process illustrated in FIGS. 6A and 6B is a more-detailed process of the process illustrated in FIG. 5. Further, the process illustrated in FIGS. 6A and 6B may be implemented using disk drive 200 in FIG. 2. In particular, this process may be implemented using clock 204, magnetic disk 210, and timing module 207 in FIG. 2.

The process begins by spinning a magnetic disk in the disk drive (operation 600). The process then reads the magnetic disk to identify the locations for a plurality of timing marks on the magnetic disk (operation 602). Next, the process changes a frequency of a clock in the disk drive from a first frequency to a second frequency to change the phase of the clock through a range of phases such that the rate of change for the phase is substantially constant (operation 604). In operation 604, the change in frequency is a step change from the first frequency to the second frequency in which the second frequency remains substantially constant.

The process waits until the rate of change for the phase of the clock becomes substantially constant (operation 606). In other words, the process waits until the rate of change for the phase settles. The process then writes a pattern of data to the magnetic disk at a location in a data track in the magnetic disk relative to a timing mark on the data track (operation 608). For example, the location may be a location before the timing mark at which writing the pattern of data at the location does not overwrite the timing mark.

Thereafter, the process then reads the timing mark after writing the pattern of data to the magnetic disk (operation 610). The process identifies a first point in time at which the timing mark is read and a first phase and a first location of the timing mark at the first point in time relative to the clock (operation 612). Next, the process determines whether a full revolution of the magnetic disk has been completed for writing to the magnetic disk (operation 614). In other words, in operation 614, the process determines whether the write path has been completed. If a full revolution of the magnetic disk has not been completed, the process returns to operation 608 as described above.

Otherwise, if a full revolution of the magnetic disk has been completed, the process reads the pattern of data and the timing mark on the magnetic disk (operation 616). The process identifies a second point in time at which the timing mark is read and a second phase and a second location of the timing mark at the second point in time relative to the clock (operation 618).

Thereafter, the process identifies a third point in time at which the pattern of data on the magnetic disk has a desired quality (operation 620). The desired quality is the pattern of data substantially aligning with a plurality of discrete islands on the magnetic disk with a desired accuracy. The process then uses the rate of change for the phase, a difference between the first point in time at which the timing mark is identified while writing to the magnetic material and the second point in time at which the timing mark is identified while reading the magnetic material, a difference between the third point in time at which the pattern of data has the desired quality and the second point in time at which the timing mark is read, a phase of the timing mark at the second point in time, and an offset to identify a selected phase (operation 622). In operation 622, the offset corresponds to a separation between a write head configured to write to the magnetic material and a read head configured to read the magnetic material.

Then, the process changes the phase of the clock to the selected phase (operation 624), with the process terminating thereafter.

Figure 7:
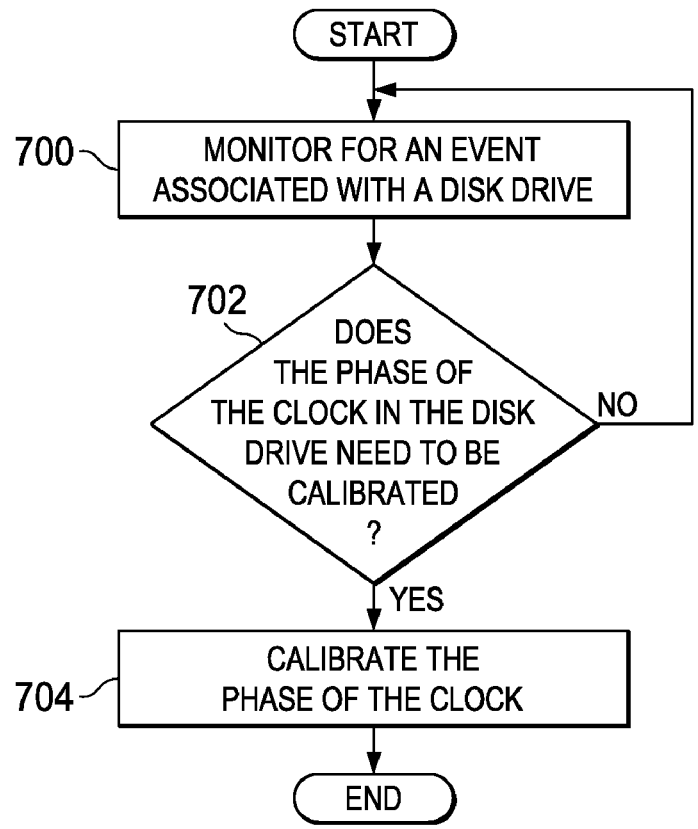
FIG. 7 is an illustration of a flowchart of a process for calibrating a phase of a clock in a disk drive in accordance with an illustrative embodiment.

With reference now to FIG. 7, an illustration of a flowchart of a process for calibrating a phase of a clock in a disk drive is depicted in accordance with an illustrative embodiment. The process illustrated in FIG. 7 may be implemented using disk drive 200 in FIG. 2. In particular, this process may be implemented using clock 204, magnetic disk 210, and timing module 207 in FIG. 2.

The process begins by monitoring for an event associated with a disk drive (operation 700). The event may be, for example, without limitation, starting the disk drive, a change in temperature in the disk drive, a change in a data track to which data is being written, a change in a clock frequency for the clock circuit, a change in a speed of the disk drive, and/or some other suitable type of event.

In response to the event occurring, the process determines whether the phase of the clock in the disk drive needs to be calibrated (operation 702). If the phase of the clock does not need to be calibrated, the process returns to operation 700. Otherwise, the process calibrates the phase of the clock (operation 704), with the process terminating thereafter. In this illustrative example, operation 704 may be performed using the processes described in FIGS. 5 and 6.

The flowcharts and block diagrams in the different depicted embodiments illustrate the architecture, functionality, and operation of some possible implementations of apparatus and methods in different illustrative embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different illustrative embodiments provide a method and disk drive for calibrating a phase for a clock in the disk drive. The phase of the clock in the disk drive is changed such that a rate of change for the phase is substantially constant. A pattern of data is written to a magnetic material in the disk drive after the rate of change for the phase becomes substantially constant and while changing the phase of the clock. A selected phase of the clock at which the pattern of data that is written on the magnetic material has a desired quality is identified using the rate of change for the phase, a point in time at which the pattern of data has the desired quality, a first point in time at which a timing mark on the magnetic material is read, and a second point in time at which the timing mark is read.

The description of the preferred embodiment of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method for calibrating a phase of a clock in a disk drive, the method comprising:
   changing the phase of the clock in the disk drive such that a rate of change for the phase is substantially constant;
   writing a pattern of data to a magnetic material in the disk drive after the rate of change for the phase becomes substantially constant and while changing the phase of the clock; and
   identifying a selected phase of the clock at which the pattern of data that is written on the magnetic material has a desired quality using the rate of change for the phase, a first point in time at which a timing mark on the magnetic material is read, a second point in time at which the timing mark is read, and a third point in time at which the pattern of data has the desired quality.

2. The method of claim 1, wherein the step of changing the phase of the clock in the disk drive such that the rate of change for the phase is substantially constant comprises:
   changing a frequency from a first frequency to a second frequency to change the phase of the clock in the disk drive through a range of phases such that the rate of change for the phase is substantially constant, wherein the second frequency remains substantially constant.

3. The method of claim 1, wherein the step of writing the pattern of data to the magnetic material in the disk drive after the rate of change for the phase becomes substantially constant and while changing the phase of the clock comprises:
   writing the pattern of data to the magnetic material in the disk drive at a location in a data track in the magnetic material after the rate of change for the phase becomes substantially constant within a selected threshold, wherein the location in the data track is relative to a number of timing marks in a plurality of timing marks on the data track.

4. The method of claim 3, wherein the timing mark is a first timing mark in the number of timing marks and wherein the location in the data track is selected from one of before the first timing mark and between the first timing mark and a second timing mark in the number of timing marks.

5. The method of claim 1, wherein the step of identifying the selected phase of the clock at which the pattern of data that is written on the magnetic material has the desired quality using the rate of change for the phase, the first point in time at which the timing mark on the magnetic material is read, the second point in time at which the timing mark is read, and the third point in time at which the pattern of data has the desired quality comprises:
   identifying the selected phase of the clock at which the pattern of data that is written on the magnetic material has the desired quality using the rate of change for the phase; a difference between the first point in time at which the timing mark is identified while writing to the magnetic material and the second point in time at which the timing mark is identified while reading the magnetic material; a difference between the third point in time at which the pattern of data has the desired quality and the second point in time at which the timing mark is read; a phase of the timing mark at the second point in time, and an offset, wherein the offset corresponds to a separation between a write head configured to write to the magnetic material and a read head configured to read the magnetic material.

6. The method of claim 1, further comprising:
   identifying the timing mark from a plurality of timing marks on the magnetic material after writing the pattern of data to the magnetic material and while following a write path, wherein the plurality of timing marks are in a plurality of fixed locations on the magnetic material;
   identifying the first point in time at which the timing mark is identified while following the write path; and
   identifying a phase and a location of the timing mark at the first point in time relative to the clock.

7. The method of claim 6, wherein the phase is a first phase and the location is a first location and further comprising:
   reading the magnetic material along a read path after writing the pattern of data to the magnetic material to read the pattern of data and the timing mark;
   identifying the second point in time at which the timing mark is identified while following the read path; and
   identifying a second phase and a second location for the timing mark at the second point in time relative to the clock.

8. The method of claim 7 further comprising:
   identifying an offset using a difference between the first phase and the second phase; a difference between the first location and the second location; and a fourth point in time at which a transition in a second pattern of data written to the magnetic material is read before the timing mark, wherein the offset corresponds to a separation between a write head configured to write to the magnetic material and a read head configured to read the magnetic material.

9. The method of claim 6, wherein the step of identifying the timing mark from the plurality of timing marks on the magnetic material after writing the pattern of data to the magnetic material comprises:
   reading the timing mark at a first location in a data track in the magnetic material, wherein the first location is after a second location in the data track at which the pattern of data is written.

10. The method of claim 9, wherein the magnetic material is a magnetic disk and further comprising:
spinning the magnetic disk; and
repeating the steps of writing the pattern of data to the magnetic material in the disk drive after the rate of change for the phase becomes substantially constant and while changing the phase of the clock; and reading the timing mark at the first location in the data track in the magnetic material, wherein the first location is after the second location in the data track at which the pattern of data is written and wherein a process is repeated for a number of additional timing marks until one revolution of the magnetic disk is complete.

11. The method of claim 1 further comprising:
reading a plurality of timing marks on the magnetic material; and
identifying a phase for each timing mark in the plurality of timing marks, wherein the phase for the each timing mark is an offset relative to the clock.

12. The method of claim 1, wherein the desired quality of the pattern of data is the pattern of data substantially aligning with a plurality of discrete islands on the magnetic material with a desired accuracy.

13. The method of claim 1 further comprising:
changing the phase of the clock to the selected phase; and
writing data to the magnetic material in the disk drive with the clock having the selected phase.

14. The method of claim 1 further comprising:
initiating the changing, writing, and identifying steps in response to at least one of starting the disk drive, a change in temperature in the disk drive, a change in a data track to which data is being written, a change in a clock frequency for the clock, and a change in a speed of the disk drive.

15. A disk drive comprising:
a clock;
a magnetic disk; and
a timing module configured to change a phase of the clock such that a rate of change for the phase is substantially constant, wherein a pattern of data is written to the magnetic disk after the rate of change for the phase becomes substantially constant and while changing the phase of the clock; and identify a selected phase of the clock at which the pattern of data that is written on the magnetic disk has a desired quality using the rate of change for the phase, a first point in time at which a timing mark on the magnetic disk is read, a second point in time at which the timing mark is read, and a third point in time at which the pattern of data has the desired quality.

16. The disk drive of claim 15, wherein in being configured to change the phase of the clock such that the rate of change for the phase is substantially constant, the timing module is configured to change a frequency from a first frequency to a second frequency, in which the second frequency remains substantially constant, to change the phase of the clock through a range of phases such that the rate of change for the phase is substantially constant.

17. The disk drive of claim 15 further comprising:
a write head configured to writing the pattern of data to the magnetic disk after the rate of change for the phase becomes substantially constant and while changing the phase of the clock.

18. The disk drive of claim 17, wherein in being configured to write the pattern of data to the magnetic disk after the rate of change for the phase becomes substantially constant and while changing the phase of the clock, the write head is configured to write the pattern of data to the magnetic disk at a location in a data track in the magnetic disk after the rate of change for the phase becomes substantially constant within a selected threshold, wherein the location in the data track is relative to a number of timing marks in a plurality of timing marks on the data track.

19. The disk drive of claim 18, wherein the timing mark is a first timing mark in the number of timing marks and wherein the location in the data track is selected from one of before the first timing mark and between the first timing mark and a second timing mark in the number of timing marks.

20. The disk drive of claim 15, wherein in being configured to identify the selected phase of the clock at which the pattern of data that is written on the magnetic material has the desired quality using the rate of change for the phase, the first point in time at which the timing mark on the magnetic material is read, the second point in time at which the timing mark is read, and the third point in time at which the pattern of data has the desired quality, the timing module is configured to identify the selected phase of the clock at which the pattern of data that is written on the magnetic material has the desired quality using the rate of change for the phase; a difference between the first point in time at which the timing mark is identified while writing to the magnetic material and the second point in time at which the timing mark is identified while reading the magnetic material; a difference between the third point in time at which the pattern of data has the desired quality and the second point in time at which the timing mark is read; a phase of the timing mark at the second point in time, and an offset, wherein the offset corresponds to a separation between a write head configured to write to the magnetic material and a read head configured to read the magnetic material.

21. The disk drive of claim 15, wherein the timing module is further configured to identify the timing mark from a plurality of timing marks on the magnetic disk after writing the pattern of data to the magnetic material and while following a write path, wherein the plurality of timing marks are in a plurality of fixed locations on the magnetic disk; identify the first point in time at which the timing mark is identified while following the write path; and identify a phase and a location of the timing mark at the first point in time relative to the clock.

22. The disk drive of claim 21, wherein the phase is a first phase and the location is a first location; wherein a read head is further configured to read the magnetic material along a read path after writing the pattern of data to the magnetic material to read the pattern of data and the timing mark; and wherein the timing module is further configured to identify the second point in time at which the timing mark is identified while following the read path; and identify a second phase and a second location for the timing mark at the second point in time relative to the clock.

23. The disk drive of claim 22, wherein the timing module is configured to identify an offset using a difference between the first phase and the second phase; a difference between the first location and the second location; and a fourth point in time at which a transition in a second pattern of data written to the magnetic material is read before the timing mark, wherein the offset corresponds to a separation between a write head configured to write to the magnetic material and the read head is configured to read the magnetic material.

24. The disk drive of claim 21, wherein in being configured to identify the timing mark from the plurality of timing marks on the magnetic disk after writing the pattern of data to the magnetic disk, the timing module is configured to read the timing mark at a first location in a data track in the magnetic disk, wherein the first location is after a second location in the data track at which the pattern of data is written.

25. The disk drive of claim 15 further comprising:
a read head configured to read a plurality of timing marks on the magnetic disk; and
wherein the timing module is further configured to identify a phase for each timing mark in the plurality of timing marks, wherein the phase for each timing mark is an offset relative to the clock.

26. The disk drive of claim 15, wherein the desired quality of the pattern of data is the pattern of data substantially aligning with a plurality of discrete islands on the magnetic disk with a desired accuracy.

27. The disk drive of claim 15, wherein the timing module is further configured to change the phase of the clock to the selected phase and further comprising:
a write head configured to write data to the magnetic disk with the clock having the selected phase.

28. The disk drive of claim 15, wherein the timing module is configured to initiate the changing and identifying steps in response to at least one of starting the disk drive, a change in temperature, a change in a data track to which data is being written, a change in a clock frequency for the clock, and a change in a speed of the disk drive.

29. A disk drive comprising:
a clock having a phase in which the phase of the clock is changed such that a rate of change for the phase is substantially constant;
a magnetic disk;
a write head configured to write a pattern of data to the magnetic disk in the disk drive at a location in a data track in the magnetic disk after the rate of change for the phase becomes substantially constant within a selected threshold and while the phase of the clock changes, wherein the location in the data track is relative to a timing mark in a plurality of timing marks on the data track, and wherein the plurality of timing marks are in a plurality of fixed locations on the magnetic disk;
a read head configured to read the plurality of timing marks on the magnetic disk and the pattern of data; and
a timing module configured to change the phase of the clock such that the rate of change for the phase is substantially constant; identify a first point in time at which the timing mark is read after writing the pattern of data to the magnetic disk while following a write path and a first phase and a first location of the timing mark at the first point in time relative to the clock; identify a second point in time at which the timing mark is read while following a read path and a second phase and a second location of the timing mark at the second point in time; identify a third point in time at which the pattern of data written to the magnetic disk has a desired quality; and identify a selected phase of the clock as the phase of the clock at the first point in time using the rate of change for the phase of the clock, a difference between the second point in time and the third point in time, a difference between the first point in time and the second point in time, and an offset corresponding to a separation between the read head and the write head.

30. The disk drive of claim 29, wherein the timing module is further configured to identify the offset based on a difference between the first phase and the second phase; a difference between the first location and the second location; and a fourth point in time at which a transition in a second pattern of data is written to the magnetic material is read before the timing mark.

31. A timing circuit for use in a disk drive having a magnetic disk comprising:
a timing module configured to change a phase of a clock such that a rate of change for the phase is substantially constant, wherein a pattern of data is written to the magnetic disk after the rate of change for the phase becomes substantially constant and while changing the phase of the clock; and the timing module is configured to identify a selected phase of the clock at which the pattern of data that is written on the magnetic disk has a desired quality using the rate of change for the phase, a first point in time at which a timing mark on the magnetic disk is read, a second point in time at which the timing mark is read, and a third point in time at which the pattern of data has the desired quality.

32. The timing circuit of claim 31, wherein the timing circuit is fabricated using integrated circuit technology.

* * * * *